(12) United States Patent
Liu

(10) Patent No.: US 11,476,691 B2
(45) Date of Patent: Oct. 18, 2022

(54) BATTERY CHARGER SYSTEM AND CONTROL METHOD

(71) Applicant: Halo Microelectronics International, Campbell, CA (US)

(72) Inventor: Rui Liu, Fremont, CA (US)

(73) Assignee: Halo Microelectronics International, Campbell, CA (US)

( * ) Notice: Subject to any disclaimer, the term of this patent is extended or adjusted under 35 U.S.C. 154(b) by 48 days.

(21) Appl. No.: 17/117,346

(22) Filed: Dec. 10, 2020

(65) Prior Publication Data
US 2022/0149644 A1   May 12, 2022

Related U.S. Application Data

(60) Provisional application No. 63/112,449, filed on Nov. 11, 2020.

(51) Int. Cl.
H02J 7/00 (2006.01)
H02J 7/34 (2006.01)

(52) U.S. Cl.
CPC .......... H02J 7/0068 (2013.01); H02J 7/0031 (2013.01); H02J 7/345 (2013.01); *H02J 7/007* (2013.01)

(58) Field of Classification Search
CPC ....................................................... H02J 7/00
See application file for complete search history.

(56) References Cited

U.S. PATENT DOCUMENTS

2009/0033293 A1* 2/2009 Xing ................... H02J 7/00712
323/284

* cited by examiner

Primary Examiner — Robert Grant
(74) Attorney, Agent, or Firm — Slater Matsil, LLP

(57) ABSTRACT

A single-stage battery charger system includes a switched capacitor converter coupled between an input power source and a load, an inductor coupled between a midpoint of the switched capacitor converter and the load, and an isolation switch coupled between the midpoint and the load, wherein the isolation switch is configured such that the single-stage battery charger system functions as a multilevel switching charger when the isolation switch is turned off, and the single-stage battery charger system functions as a switched capacitor charger when the isolation switch is turned on.

20 Claims, 9 Drawing Sheets

BATTERY CHARGER SYSTEM AND CONTROL METHOD

PRIORITY CLAIM AND CROSS-REFERENCE

This application claims the benefit of U.S. Provisional Application No. 63/112,449, filed on Nov. 11, 2020, entitled "Battery Charger System and Control Method," which application is hereby incorporated herein by reference.

TECHNICAL FIELD

The present invention relates to a battery charger system, and, in particular embodiments, to a single-stage battery charger system.

BACKGROUND

As technologies further advance, a variety of portable devices, such as mobile phones, tablet PCs, digital cameras, MP3 players and/or the like, have become popular. Each portable device may employ a plurality of rechargeable battery cells. The plurality of rechargeable battery cells may be connected in series or in parallel so as to form a rechargeable battery pack for storing electrical energy.

Battery chargers are employed to restore energy to the plurality of rechargeable battery cells. The battery charger is controlled to provide voltage (e.g., a constant voltage charging mode) and current (e.g., a constant current charging mode) to the plurality of rechargeable battery cells so as to restore energy to the battery.

As power consumption has become more important, there may be a need for reducing the length of time to charge the battery. Fast charging has emerged as a veritable solution to satisfy the ever-changing demand from consumers. In a fast charging system, a switched capacitor converter is employed to deliver high current to the battery while keeping the input current (e.g., USB cable current) low. The switched capacitor converter has various advantages such as monolithic integration of the converter without external inductors, high power conversion efficiency and the like. The switched capacitor converter is capable of achieving a safe and quick charging of large-capacity batteries.

FIG. 1 illustrates a dual-stage battery charger system. The dual-stage battery charger system comprises two power stages connected in parallel. A first power stage is a switched capacitor charger 100. A second power stage is a switching charger 200. The switched capacitor charger 100 is preferred to be used to provide power to a battery 103 during the constant current charging mode, while the switching charger 200 is more commonly used to provide power to the battery 103 during the constant voltage charging mode to complete the charging.

The switched capacitor charger 100 is implemented as a dual-phase switched capacitor converter. A first phase includes switches 121, 122, 123 and 124 connected in series between an input voltage bus 150 and ground. A first flying capacitor 125 is connected between a common node of switches 121 and 122, and a common node of switches 123 and 124. A common node 127 of the switches 122 and 123 is connected to an output voltage bus 550 connected to the battery 103 and an output capacitor 136. The battery 103 and the output capacitor 136 are connected in parallel.

A second phase includes switches 131, 132, 133 and 134 connected in series between the input voltage bus 150 and ground. A second flying capacitor 135 is connected between a common node of switches 131 and 132, and a common node of switches 133 and 134. A common node 137 of the switches 132 and 133 is connected to the output voltage bus 550. As shown in FIG. 1, the output voltage bus 550 is connected to the battery 103 and the output capacitor 136.

A dual-phase charge pump controller 120 is configured to generate gate drive signals for switches 121-124 and 131-134. An input capacitor 102 is coupled between the input voltage bus 150 and ground. The input voltage bus 150 is coupled to an input voltage source VIN through an isolation switch. As shown in FIG. 1, the isolation switch is formed by two back-to-back connected switches 111 and 112. A battery reverse block controller 110 is configured to generate gate drive signals for switches 111 and 112.

The switches of the switched capacitor charger 100 are implemented as metal oxide silicon field effect transistors (MOSFETs). As shown in FIG. 1, the switched capacitor charger 100 comprises ten MOSFETs (111, 112, 121-124 and 131-134). Switch 111 is implemented as a high voltage MOSFET. Switch 111 can withstand up to 28 V. Switches 112, 121-124 and 131-134 are low voltage MOSFETs. The Switches 112, 121-124 and 131-134 can withstand up to 6 V.

The switching charger 200 is implemented as a step-down power converter. The switching charger 200 includes switches 222 and 223 connected in series between an input voltage bus 250 and ground. An inductor 224 is connected between a common node (node 227) of switches 222 and 223, and an output voltage bus 226. An output capacitor 225 is connected between the output voltage bus 226 and ground. A switching charger controller 220 is configured to generate gate drive signals for switches 222 and 223.

An input capacitor 221 is coupled between the input voltage bus 250 and ground. The input voltage bus 250 is coupled to the input voltage source VIN through a switch 211. A battery reverse block controller 210 is configured to generate a gate drive signal for switch 211. The switch 211 is employed to connect the switching charger 200 to the input power source VIN or disconnect the switching charger 200 from the input power source VIN.

The output voltage bus 226 is coupled to the battery 103 through a switch 231. The switch 231 is implemented as an isolation switch. In particular, the switch 231 provides isolation between the load (e.g., the battery 103) and the output voltage bus 226. As shown in FIG. 1, the bulk terminal of the switch 231 is not connected to the source of the switch 231. The switch 23 lincludes two diodes. A first diode is between the bulk terminal and the source. A second diode is between the bulk terminal and the drain. These two diodes are back-to-back connected. As a result of having the back-to-back connected diodes, the switch 231 functions as the isolation switch. A power path controller 230 is configured to generate a gate drive signal for the switch 231. The switch 231 is employed to connect the battery 103 to the switching charger 200 or disconnect the battery 103 from the switching charger 200.

The switches of the switching charger 200 are implemented as MOSFETs. As shown in FIG. 1, the switching charger 200 comprises four MOSFETs (211, 222, 223 and 231). Switches 222 and 223 are implemented as high voltage MOSFETs. Switches 222 and 223 can withstand up to 14 V. Switches 211 and 231 are low voltage MOSFETs. The Switches 211 and 231 can withstand up to 6 V.

The battery charger system shown in FIG. 1 includes fourteen MOSFETs including one 28 V MOSFET, two 14 V MOSFETs and eleven low voltage MOSFETs (e.g., voltage rating of about 6V).

In operation, when the battery 103 is charged under a constant current mode, the switched capacitor charger 100 is enabled, and the switching charger 200 is disabled. The switched capacitor charger 100 provides power to the battery 103. As the battery voltage increases beyond a certain threshold (e.g., 4.2 V), the battery enters into a constant voltage mode during which, either the switched capacitor charger 100 or the switching charger 200 can be used to charge the battery 103. At the beginning of the constant voltage charging mode, the switched capacitor charger 100 is used to provide power for the battery 103. The charging current reduces as the battery voltage rises. As the charging current dips below a certain threshold (e.g., 2 A), the switching charger 200 is then used to provide a constant voltage for the battery 103 to complete the battery charging process.

FIG. 2 illustrates another dual-stage battery charger system. The dual-stage battery charger system comprises two power stages. A first power stage is a switched capacitor charger 100. A second power stage is a three-level switching charger 300. The switched capacitor charger 100 is used primarily to provide power to the battery 103 during the constant current charging mode. The three-level switching charger 300 is used to provide power to the battery 103 to complete the constant voltage charging mode. The switched capacitor charger 100 has been described in detail above with respect to FIG. 1, and hence is not discussed again herein.

The three-level switching charger 300 includes switches 321, 322, 323 and 324 connected in series between an input voltage bus 350 and ground. A third flying capacitor 325 is connected between a common node of switches 321 and 322, and a common node of switches 323 and 324. A common node (node 327) of the switches 322 and 323 is connected to an output voltage bus 328 through an inductor 326. A three-level switching charger controller 320 is configured to generate gate drive signals for switches 321-324.

An output capacitor 329 is connected between the output voltage bus 328 and ground. An input capacitor 312 is coupled between the input voltage bus 350 and ground. The input voltage bus 350 is coupled to the input voltage source VIN through a switch 311. A battery reverse block controller 310 is configured to generate a gate drive signal for switch 311. The switch 311 is employed to connect the three-level switching charger 300 to the input power source VIN or disconnect the three-level switching charger 300 from the input power source VIN.

The output voltage bus 328 is coupled to the battery 103 through a switch 331. The switch 331 is similar to the switch 231 described above with respect to FIG. 1, and hence is not discussed again herein.

The switches of the three-level switching charger 300 are implemented as MOSFETs. As shown in FIG. 2, the three-level switching charger 300 comprises six MOSFETs (311, 321-324 and 331). Switch 321 is implemented as a high voltage MOSFET. Switch 321 can withstand up to 14 V. Switches 322-324, 311 and 331 are low voltage MOSFETs. The Switches 322-324, 311 and 331 can withstand up to 6V.

The battery charger system shown in FIG. 2 includes sixteen MOSFETs including one 28 V MOSFET, one 14 V MOSFETs and fourteen low voltage MOSFETs (e.g., voltage rating of about 6V).

As power consumption has become more important, there may be a need for simplifying the battery chargers shown in FIGS. 1-2. More particularly, the battery charger systems including two power stages (e.g., chargers 100 and 200 shown in FIG. 1, and chargers 100 and 300 shown in FIG. 2). The dual-stage charger system is not cost-effective. It is desirable to have a single-stage charger system to perform the functions of the dual-stage charger system described above with respect to FIGS. 1-2.

SUMMARY

These and other problems are generally solved or circumvented, and technical advantages are generally achieved, by preferred embodiments of the present disclosure which provide a single-stage battery charger system.

In accordance with an embodiment, a single-stage battery charger system comprises a switched capacitor converter coupled between an input power source and a load, an inductor coupled between a midpoint of the switched capacitor converter and the load, and an isolation switch coupled between the midpoint and the load, wherein the isolation switch is configured such that the single-stage battery charger system functions as a multilevel switching charger when the isolation switch is turned off, and the single-stage battery charger system functions as a switched capacitor charger when the isolation switch is turned on.

In accordance with another embodiment, a method comprises in a first battery charging period of a battery charging process, turning on an isolation switch, and configuring a single-stage battery charger as a switched capacitor charger, and in a second battery charging period of the battery charging process, turning off the isolation switch, and configuring the single-stage battery charger as a multilevel switching charger.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a single-stage battery charger system. The invention may also be applied, however, to a variety of power systems. Hereinafter, various embodiments will be explained in detail with reference to the accompanying drawings.

Figure 3:
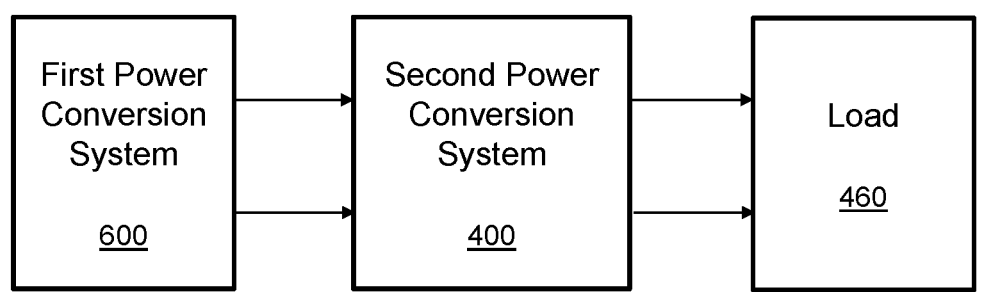
FIG. 3 illustrates a block diagram of a battery charger system in accordance with various embodiments of the present disclosure.

FIG. 3 illustrates a block diagram of a battery charger system in accordance with various embodiments of the present disclosure. The battery charger system includes a first power conversion system 600, a second power conversion system 400 and a load 460 connected in cascade. In some embodiments, the first power conversion system 600 is implemented as an adaptor. The adaptor may include an alternating current/direct current (AC/DC) converter (not shown) that converts a utility line voltage to a direct-current voltage. As shown in FIG. 3, the adaptor is employed to provide power for the second power conversion system 400. Alternatively, the first power conversion system 600 may be implemented as a wireless power transfer system. The wireless power transfer system has a transmitter coupled to a power source and a receiver coupled to the second power conversion system 400. Furthermore, the first power conversion system 600 may be a power converter having an input coupled to any suitable energy storage devices such as rechargeable batteries, fuel cells, any combinations thereof and/or the like.

Figure 1:
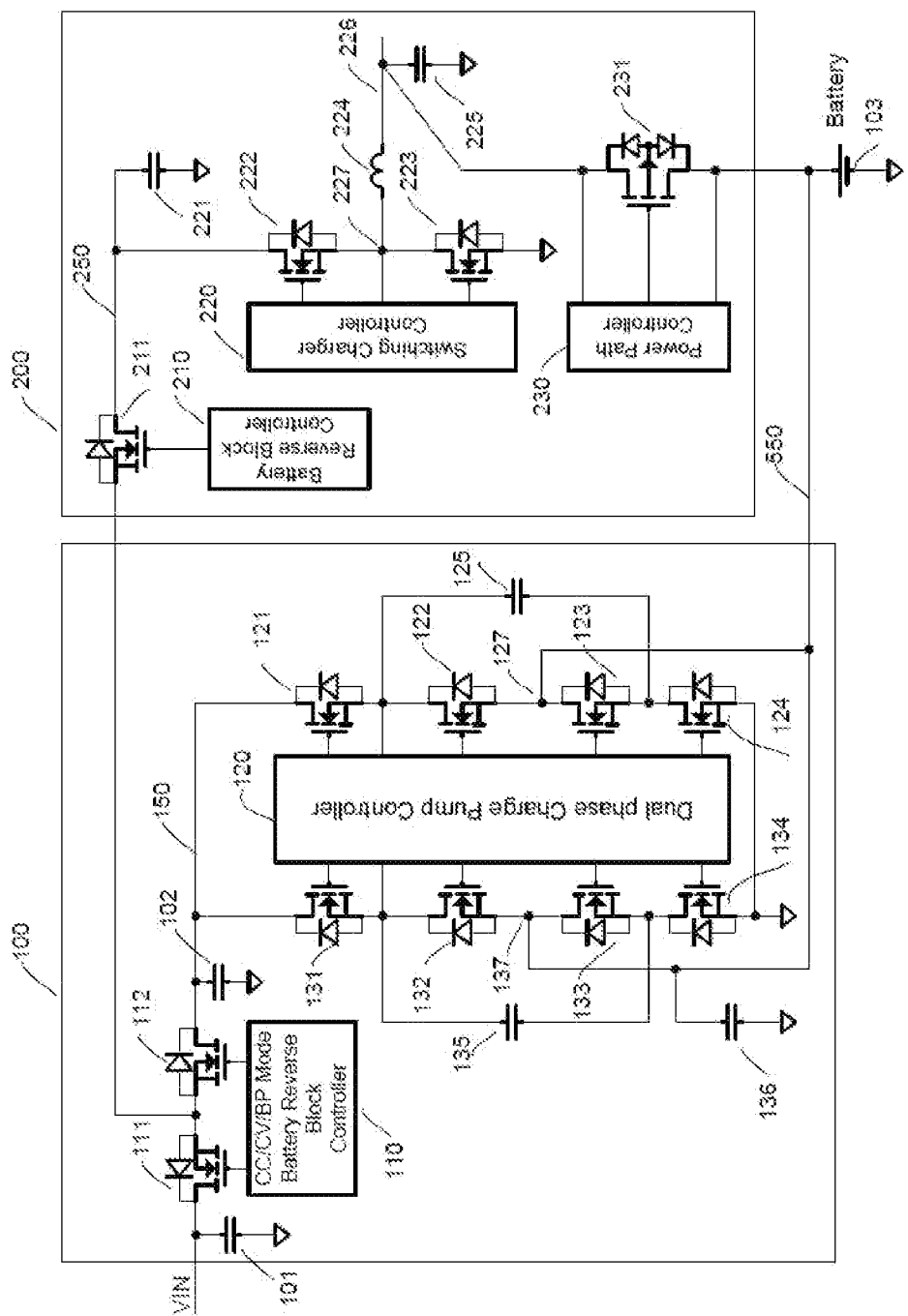
FIG. 1 illustrates a dual-stage battery charger system.
Figure 2:
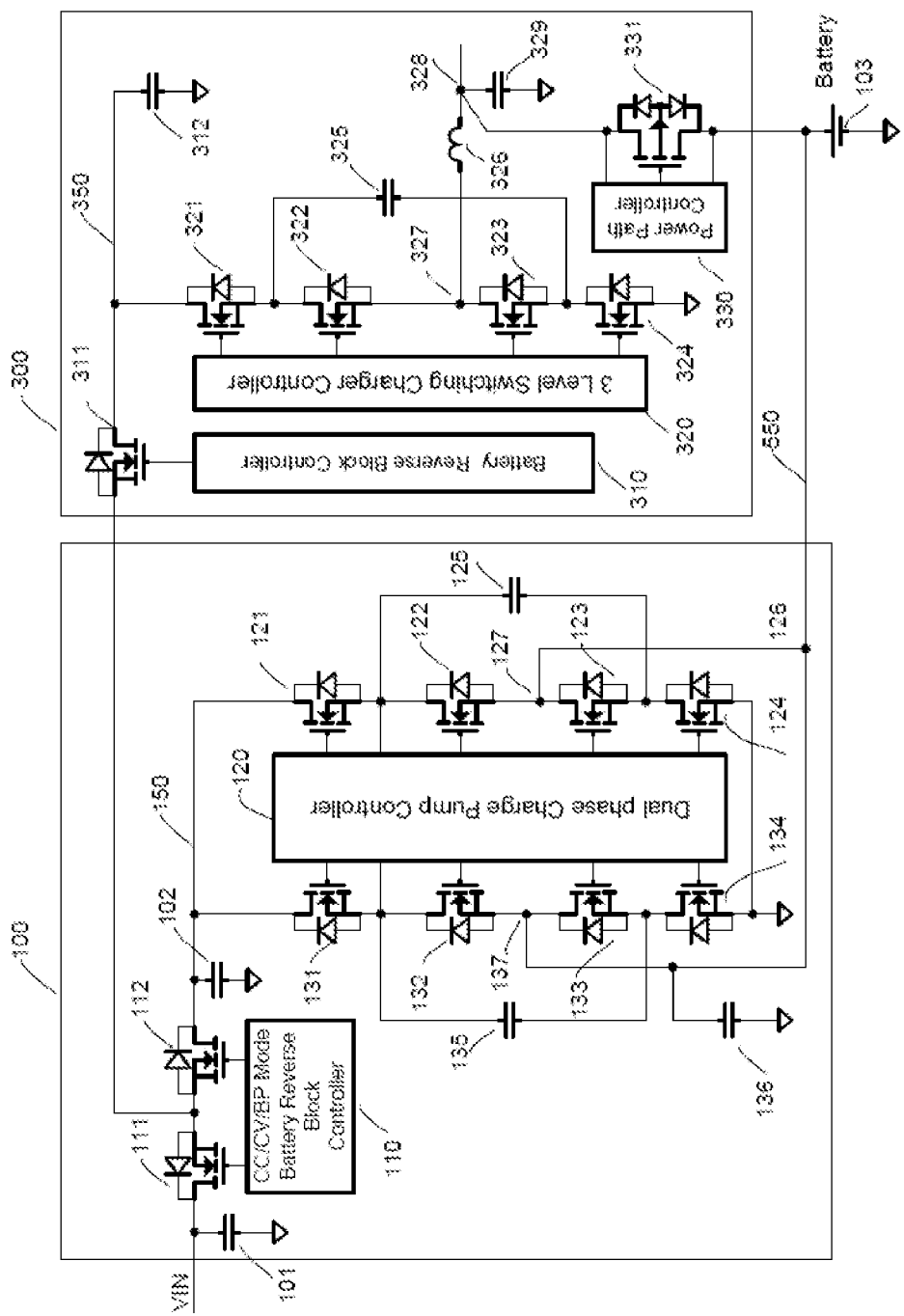
FIG. 2 illustrates another dual-stage battery charger system.

The second power conversion system 400 is implemented as a single-stage battery charger system. The single-stage battery charger system can be used to replace the dual-stage battery charger system shown in FIGS. 1-2. The detailed implementations of the second power conversion system 400 will be described below with respect to FIGS. 4-8.

In some embodiments, the load 460 may refer to a rechargeable battery and/or batteries connected in series/parallel, and coupled to the output of the second power conversion system 400. Throughout the description, the load 460 may be alternatively referred to as the battery 460.

In operation, when the battery 460 operates in the constant current charging phase with a large charging current, the single-stage battery charger system is configured as a dual-phase switched capacitor charger. The dual-phase switched capacitor charger is an open-loop power converter. The adaptor of the first power conversion system 600 provides voltage regulation for the battery charger system. When the battery 460 is in the constant voltage charging phase, the single-stage battery charger system may be configured as a dual-phase switched capacitor charger or a multilevel switching charger depending on the voltage regulation capability of the adaptor and the charging current. Usually, when the system just comes out of the constant current fast charging phase (large charging current) and enters into the constant voltage charging phase, the charging current is high. Under this operating condition, the voltage resolution and accuracy of the adaptor is adequate in keeping a high battery charging current. As such, the single-stage battery charger system may be configured as a dual-phase switched capacitor charger. On the other hand, as the constant voltage charging phase progresses and the charging current reduces, oftentimes the voltage resolution and accuracy of the adaptor cannot provide the highest charging current possible during the final parts of the constant voltage charging. Under this operating condition, the single-stage battery charger system may be configured as a multilevel switching charger. The detailed schematic diagram and operating principle of the single-stage battery charger system will be described below with respect to FIGS. 4-8.

Figure 4:
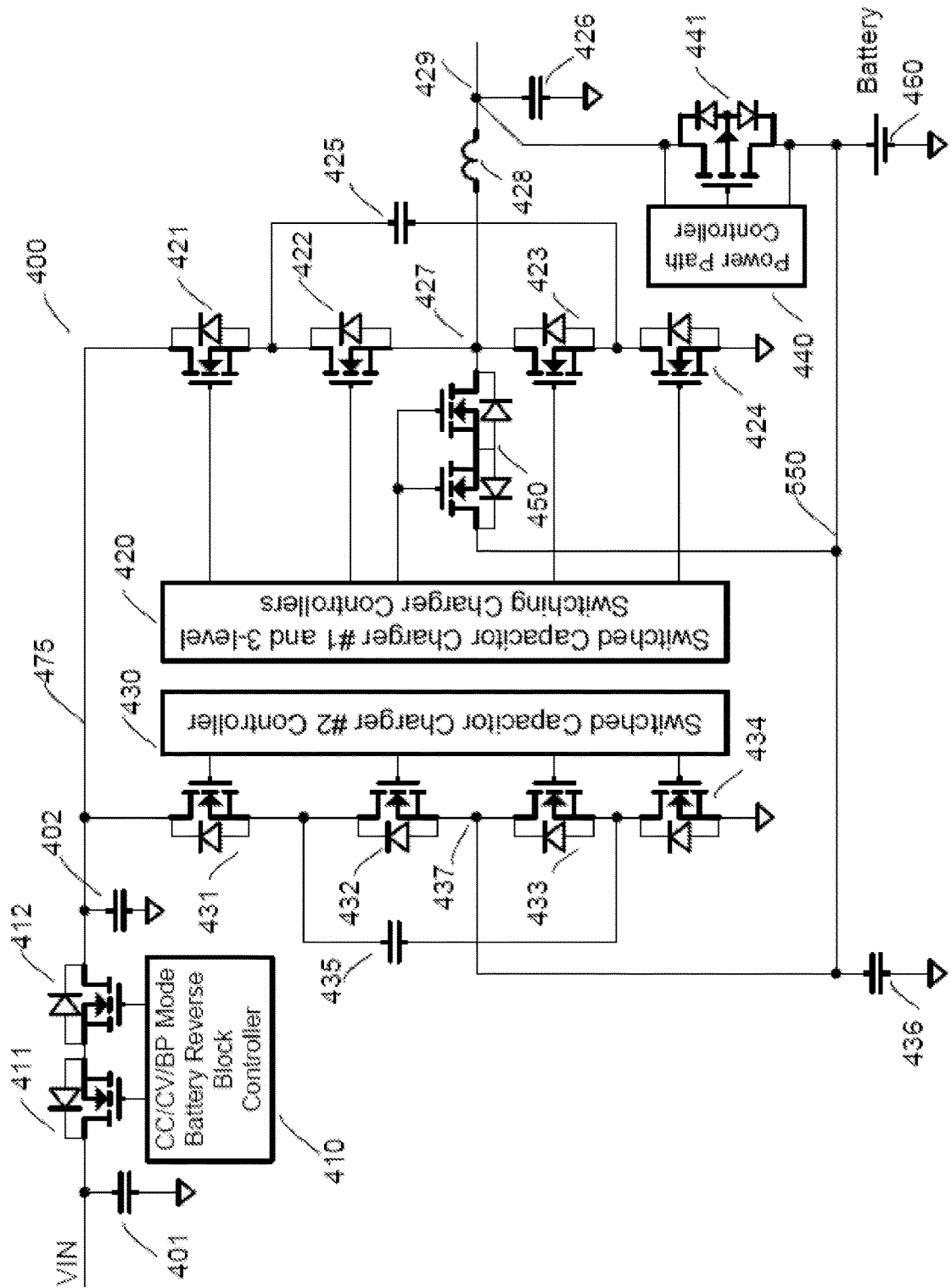
FIG. 4 illustrates a schematic diagram of a first implementation of the single-stage battery charger system shown in FIG. 3 in accordance with various embodiments of the present disclosure.

FIG. 4 illustrates a schematic diagram of a first implementation of the single-stage battery charger system shown in FIG. 3 in accordance with various embodiments of the present disclosure. The single-stage battery charger system 400 comprises a single power stage. The single power stage may be alternatively referred to as a single multi-mode power conversion stage. This single-stage battery charger system 400 comprises a dual-phase switched capacitor converter, an inductor 428 and an isolation switch 450. As shown in FIG. 4, the dual-phase switched capacitor converter is coupled between an input power source VIN and the battery 460. The inductor 428 is coupled between a midpoint 427 of one phase of the dual-phase switched capacitor converter and the battery 460. The isolation switch 450 is coupled between the midpoint 427 and the battery 460.

As shown in FIG. 4, the dual-phase switched capacitor converter comprises two phases. A first phase includes switches 431, 432, 433 and 434 connected in series between an input voltage bus 475 and ground. A first flying capacitor 435 is connected between a common node of switches 431 and 432, and a common node of switches 433 and 434. A common node 437 of the switches 432 and 433 is connected to an output voltage bus 550. As shown in FIG. 4, the output voltage bus 550 is connected to the battery 460 and an output capacitor 436. The battery 460 and the output capacitor 436 are connected in parallel. Throughout the description, the first phase may be alternatively referred to as a first leg of the dual-phase switched capacitor converter.

A second phase of the dual-phase switched capacitor converter includes switches 421, 422, 423 and 424 connected in series between the input voltage bus 475 and ground. A second flying capacitor 425 is connected between a common node of switches 421 and 422, and a common node of switches 423 and 424. A common node 427 of the switches 422 and 423 is connected to the output voltage bus 550 through the isolation switch 450. The inductor 428 has a first terminal connected to the common node 427 (also known as midpoint 427), and a second terminal coupled to a voltage bus 429. The voltage bus 429 is connected to the output voltage bus 550 through a switch 441. Throughout the description, the second phase may be alternatively referred to as a second leg of the dual-phase switched capacitor converter.

A switched capacitor charger controller 430 is configured to generate gate drive signals for switches 431-434. A switched capacitor charger/three-level switching charger controller 420 is configured to generate gate drive signals for switches 421-424, and the isolation switch 450.

An input capacitor 402 is coupled between the input voltage bus 475 and ground. The input voltage bus 475 is coupled to the input voltage source VIN through an isolation switch formed by two back-to-back connected switches 411 and 412. A battery reverse block controller 410 is configured to generate gate drive signals for switches 411 and 412. The isolation switch formed by switches 411 and 412 is employed to connect the single-stage battery charger system to the input power source VIN or disconnect the single-stage battery charger system from the input power source VIN. It should be noted that the switch 411 is primarily used for over-voltage protection. The switch 412 is primarily used for reverse blocking.

The switch 441 is implemented as a bulk switch. A power path controller 440 is configured to generate a gate drive signal for the switch 441. When the switch 441 is turned on, the voltage bus 429 is connected to the battery 460. When the switch 441 is turned off, the voltage bus 429 is disconnected from the battery 460. In some embodiments, the voltage bus 429 is connected to a system to be powered up by the battery 460. In operation, the battery 460 may be depleted to a very low voltage. This very low voltage is no longer able to power up the system. The switch 441 may be turned off so as to disconnect the system from the battery 460. The power source VIN is able to power up the system without waiting for the battery 460 to be charged to a voltage level suitable for powering up the system. Furthermore, during the process of charging the battery 460, the switch 441 may function as a linear regulator depending on design needs. For example, during a pre-charge stage, the required charging current is quite small. The switch 441 may be configured as a linear regulator to charge the battery 460 with a small charging current.

The switches of the single-stage battery charger system 400 are implemented as MOSFETs. As shown in FIG. 4, the single-stage battery charger system 400 comprises twelve MOSFETs (411-412, 421-424, 431-434, 441 and 450). Switch 411 is implemented as a high voltage MOSFET. Switch 411 can withstand up to 28 V. Switches 412, 421-424, 431-434, 441 and 450 are low voltage MOSFETs. The Switches 412, 421-424, 431-434, 441 and 450 can withstand up to 6V.

In accordance with an embodiment, the switches of FIG. 4 may be MOSFET devices. Alternatively, the switching element can be any controllable switches such as insulated gate bipolar transistor (IGBT) devices, integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices, silicon carbide (SiC) based power devices and the like.

It should be noted while FIG. 4 shows the switches (e.g., switch 434) are implemented as single n-type transistors, a person skilled in the art would recognize there may be many variations, modifications and alternatives. For example, depending on different applications and design needs, all or at least some of the switches may be implemented as p-type transistors. Furthermore, each switch shown in FIG. 4 may be implemented as a plurality of switches connected in parallel. Moreover, a capacitor may be connected in parallel with one switch to achieve zero voltage switching (ZVS)/zero current switching (ZCS).

In operation, the isolation switch 450 is configured such that the second phase (the second leg comprising switches 421-424) of the dual-phase switched capacitor converter functions as a three-level switching charger in conjunction with the inductor 428 when the isolation switch 450 is turned off. On the other hand, and the single-stage battery charger system functions as a dual-phase switched capacitor charger when the isolation switch 450 is turned on.

As shown in FIG. 4, when the isolation switch 450 is turned on, the node 427 is connected to the node 437 directly. The single-stage battery charger system is configured as a dual-phase switched capacitor charger for providing power to the battery 460 during the constant current charging mode with a large charging current. When the isolation switch 450 is turned off, the node 427 is disconnected from the node 437. The second leg (switches 421-424) of the dual-phase switched capacitor converter and the inductor 428 form a three-level switching charger for providing power to the battery 460 through the isolation switch 441 during part of the constant voltage charging mode (e.g., the constant voltage charging mode with a small charging current). During the constant voltage charging mode, an output voltage of the three-level switching charger is higher than a voltage of the load (e.g., battery 460). In some embodiments, during the constant voltage charging mode, the switched capacitor charger controller 430 may turn off the switches 431-434 of the first leg.

In operation, depending on design needs, the dual-phase switched capacitor converter may be configured as a single-phase switched capacitor charger. More particularly, the isolation switch 450 is turned off. The switches 421-424 of the second leg are turned off by the switched capacitor charger/three-level switching charger controller 420. The switches 431-434 of the first leg are turned on and off by the switched capacitor charger controller 430 according to the operating principle of the single-phase switched capacitor charger.

In operation, depending on design needs, the single-stage battery charger system may be configured as a single-phase switched capacitor charger and a three-level switching charger. More particularly, the isolation switch 450 is turned off. The switches 421-424 of the second leg of the dual-phase switched capacitor converter are turned on and off by the switched capacitor charger/three-level switching charger controller 420 according to the operating principle of the three-level switching charger. The switches 431-434 of the first leg are turned on and off by the switched capacitor charger controller 430 according to the operating principle of the single-phase switched capacitor charger. When the single-stage battery charger system is configured as a single-phase switched capacitor charger and a three-level switching charger, an output voltage of the three-level switching charger is higher than an output voltage of the single-phase switched capacitor charger.

In operation, during the final stage of the constant voltage charging mode, the single-stage battery charger system may be configured as a buck switching charger. More particularly, the isolation switch 450 is turned off. The switches 431-434 of the first leg are turned off by the switched capacitor charger controller 430. The switches 421 and 424 are configured as always-on switches. The switches 422 and 423 are turned on and off according to the operating principle of the buck switching charger. One advantageous feature of having this configuration is configuring the switches 421 and 424 as always-on switches helps to reduce switching losses, thereby improving the efficiency of the battery charger system.

In operation, depending on design needs, when the input voltage source VIN is not available, the battery 460 may be configured as a power source. The inductor 428 and the switches 431-434 of the first leg form a boost converter configured to convert the voltage of the battery 460 to a higher voltage. Furthermore, through controlling the boost converter, the voltage on the input voltage bus 475 can be adjusted accordingly. The switch 412 may be turned on so that the voltage on the input voltage bus (VIN) is adjustable. The adjustable voltage (VIN) can be used to power OTG (on the go) devices, power reverse wireless charging and the like.

Figure 5:
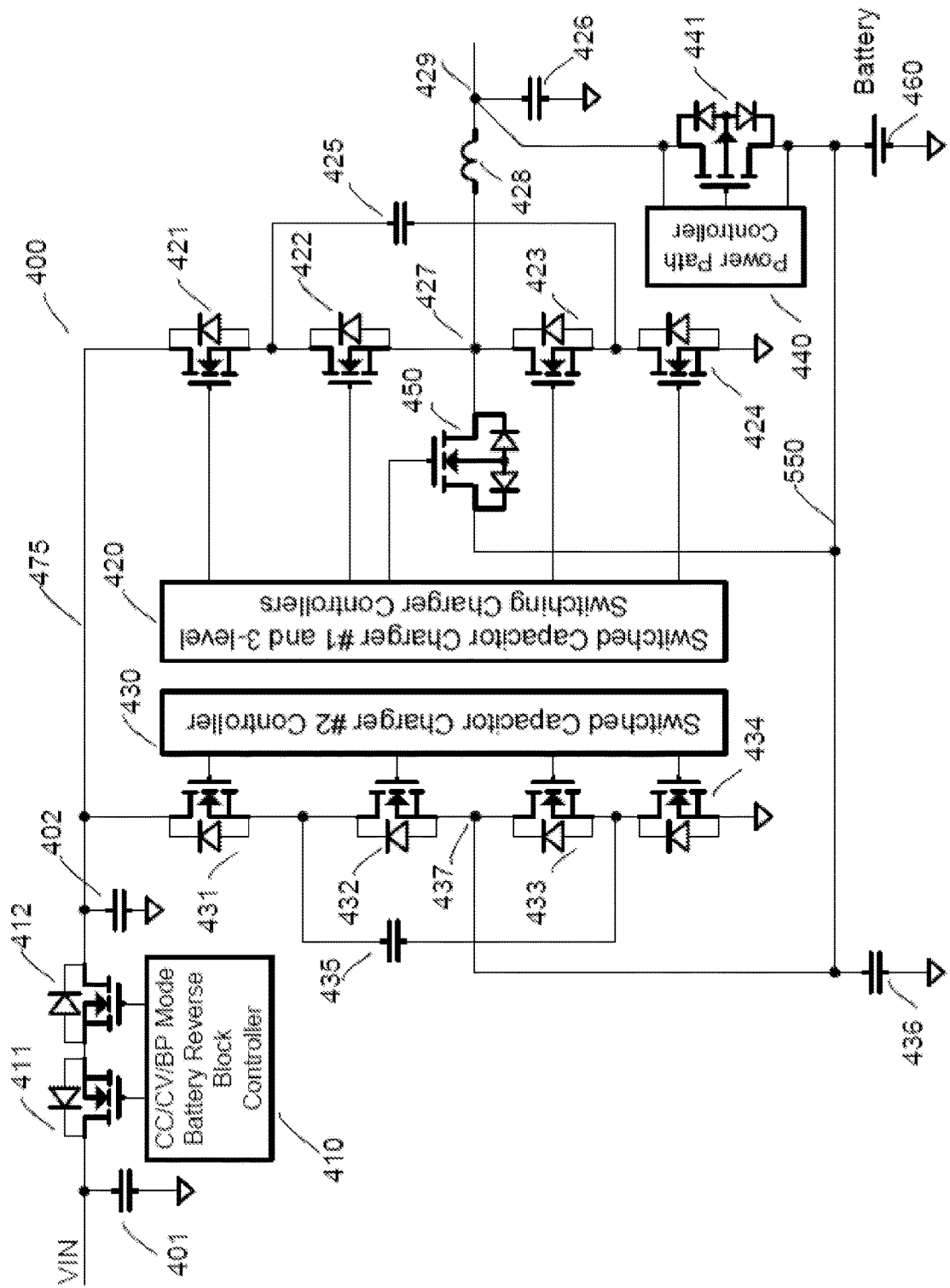
FIG. 5 illustrates a schematic diagram of a second implementation of the single-stage battery charger system shown in FIG. 3 in accordance with various embodiments of the present disclosure.

FIG. 5 illustrates a schematic diagram of a second implementation of the single-stage battery charger system shown in FIG. 3 in accordance with various embodiments of the present disclosure. The single-stage battery charger system shown in FIG. 5 is similar to that shown in FIG. 4 except that the isolation switch 450 is implemented as a bulk switch. As shown in FIG. 5, the bulk terminal of the isolation switch 450 is not connected to the source of the isolation switch 450. The isolation switch 450 includes two diodes. A first diode is between the bulk terminal and the source. A second diode is between the bulk terminal and the drain. These two diodes are back-to-back connected. As a result of having the back-to-back connected diodes, the isolation switch 450 is able to provide isolation between the node 427 and the output voltage bus 550.

It should be noted that a bulk control circuit may be connected to the common node of the two back-to-back connected diodes. The bulk control circuit is employed to control the characteristics of the channel of the isolation switch 450 through adjusting the voltage potential at the bulk terminal of the isolation switch 450. In some embodiments, the bulk control circuit is configured to pull the bulk terminal of the isolation switch 450 down to ground when the battery charger system is in an off state. When the battery charger system is ready to be turned on, and prior to powering up the battery charger system, the bulk terminal of the isolation switch 450 will be connected to the source of the isolation switch 450 through a switch.

Figure 6:
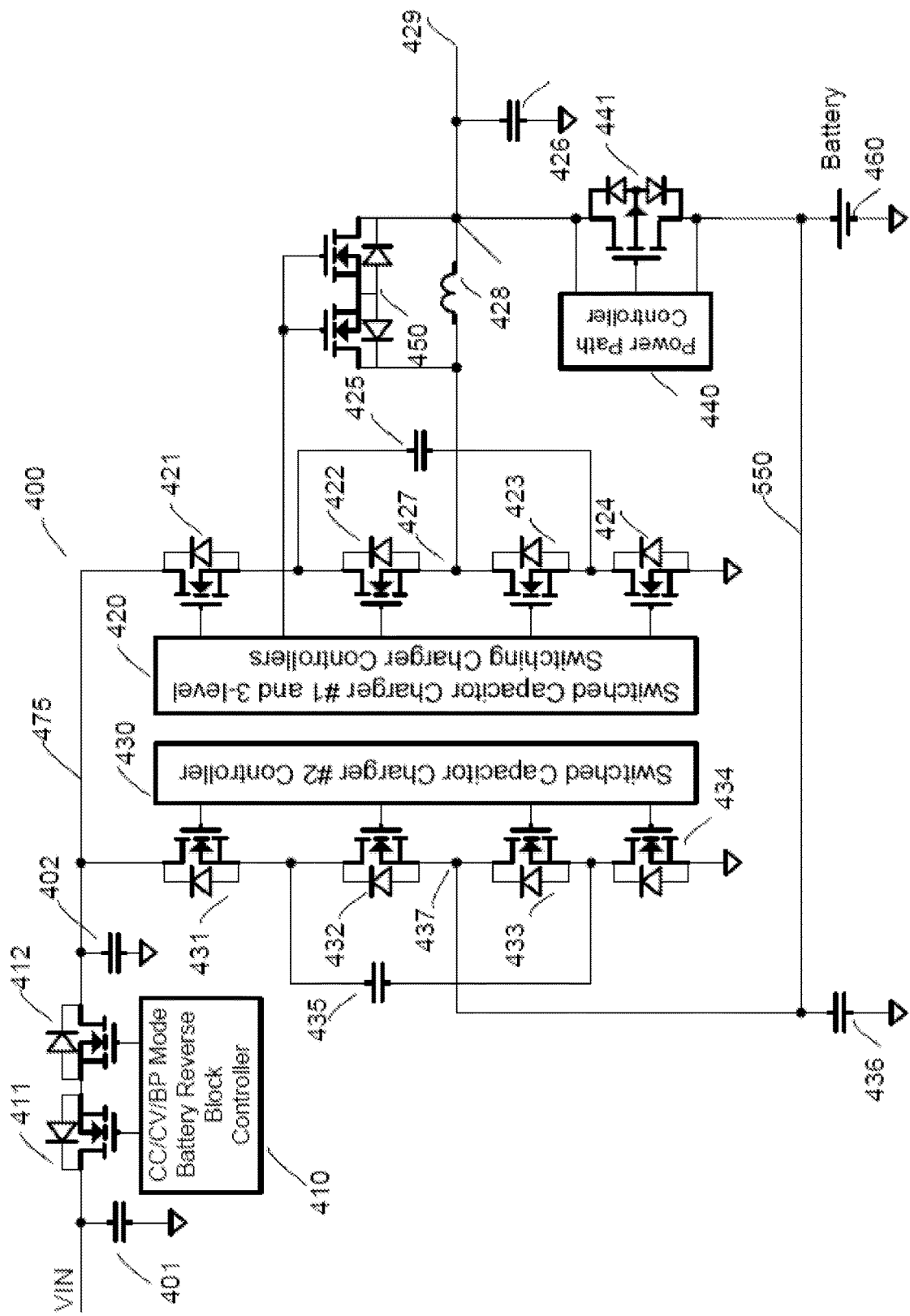
FIG. 6 illustrates a schematic diagram of a third implementation of the single-stage battery charger system shown in FIG. 3 in accordance with various embodiments of the present disclosure.

FIG. 6 illustrates a schematic diagram of a third implementation of the single-stage battery charger system shown in FIG. 3 in accordance with various embodiments of the present disclosure. The single-stage battery charger system shown in FIG. 6 is similar to that shown in FIG. 4 except that the isolation switch 450 is connected in parallel with the inductor 428.

In operation, the isolation switch 450 is configured such that the single-stage battery charger system functions as a three-level switching charger when the isolation switch 450 is turned off. On the other hand, and the single-stage battery charger system functions as a dual-phase switched capacitor charger when the isolation switch 450 is turned on.

As shown in FIG. 6, when the isolation switch 450 and switch 441 are turned on, the node 427 is connected to the node 437. The single-stage battery charger system is configured as a dual-phase switched capacitor charger for providing power to the battery during the constant current charging mode with a large charging current. When the isolation switch 450 is turned off, the second leg (switches 421-424) of the dual-phase switched capacitor converter and the inductor 428 form a three-level switching charger for providing power to the battery during part of the constant voltage charging mode (e.g., the constant voltage charging mode with a small charging current). During the constant voltage charging mode, an output voltage of the three-level switching charger is higher than a voltage of the load (e.g., battery 460). In some embodiments, during the constant voltage charging mode, the switched capacitor charger controller 430 may turn off the switches 431-434.

Figure 7:
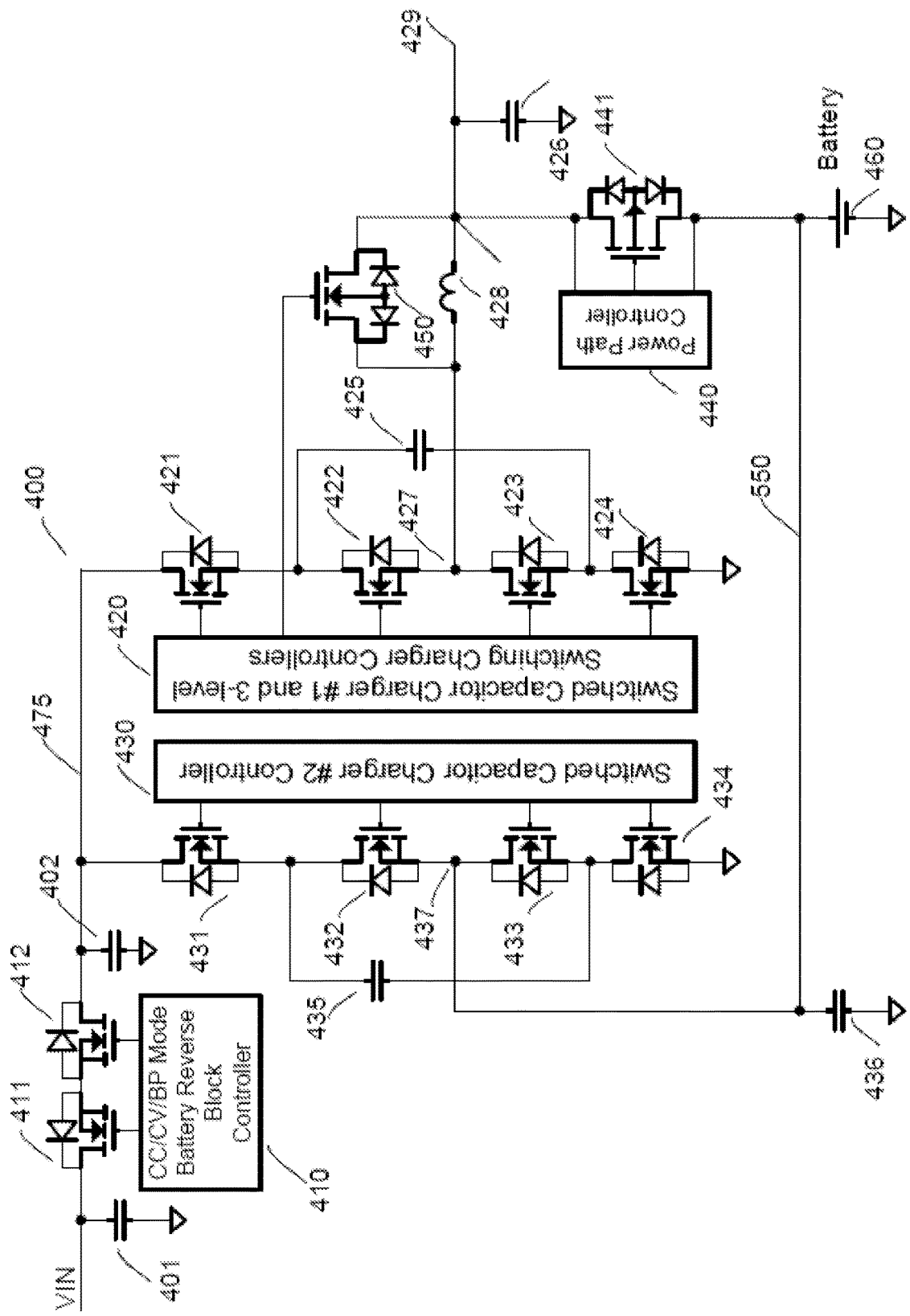
FIG. 7 illustrates a schematic diagram of a fourth implementation of the single-stage battery charger system shown in FIG. 3 in accordance with various embodiments of the present disclosure.

FIG. 7 illustrates a schematic diagram of a fourth implementation of the single-stage battery charger system shown in FIG. 3 in accordance with various embodiments of the present disclosure. The single-stage battery charger system shown in FIG. 7 is similar to that shown in FIG. 6 except that the isolation switch 450 is implemented as a bulk switch. The operating principle of the bulk switch has been described above with respect to FIG. 5, and hence is not discussed again herein.

Figure 8:
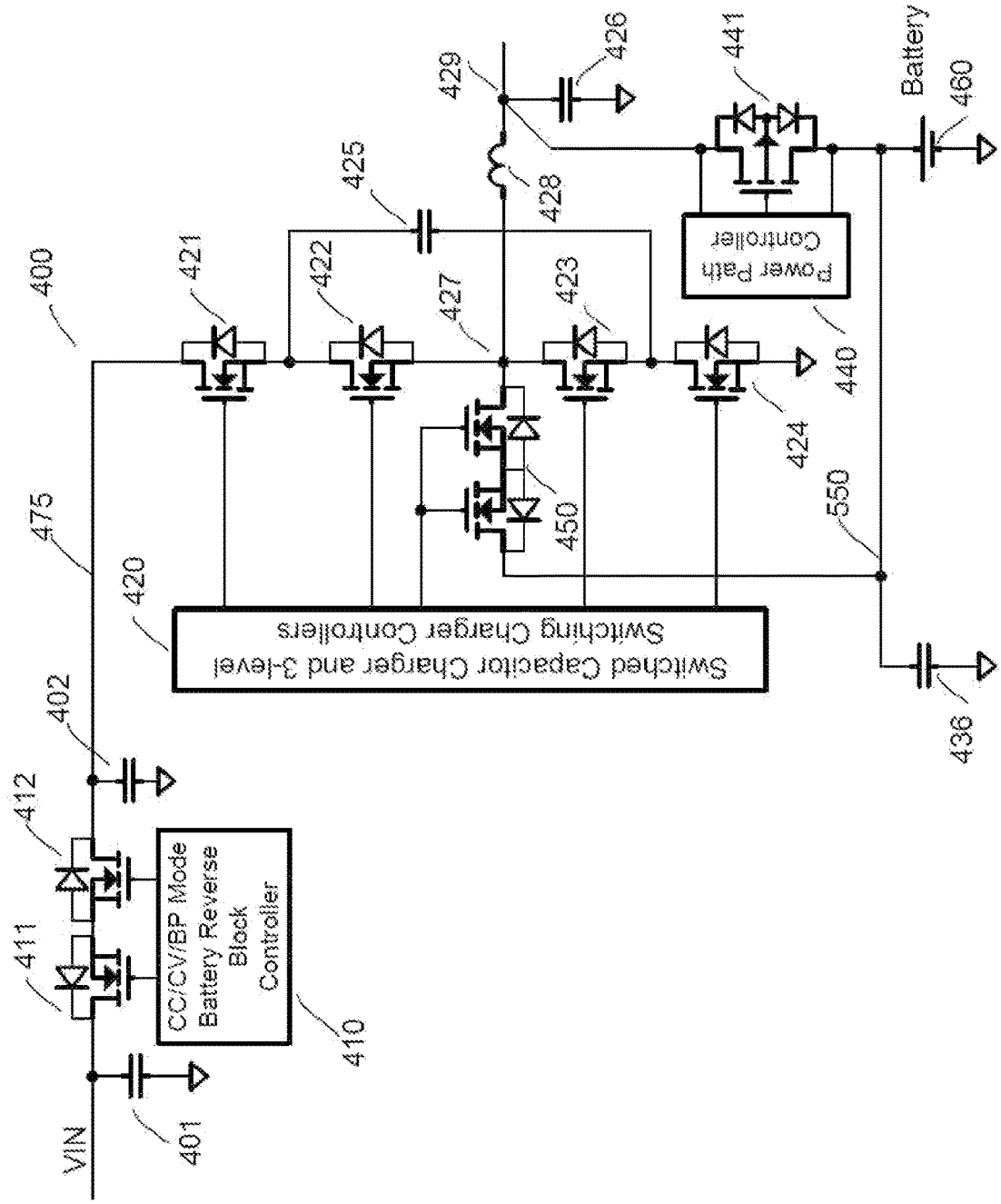
FIG. 8 illustrates a schematic diagram of a fifth implementation of the single-stage battery charger system shown in FIG. 3 in accordance with various embodiments of the present disclosure.

FIG. 8 illustrates a schematic diagram of a fifth implementation of the single-stage battery charger system shown in FIG. 3 in accordance with various embodiments of the present disclosure. The single-stage battery charger system shown in FIG. 8 is similar to that shown in FIG. 4 except that the dual-phase switched capacitor converter shown in FIG. 4 is replaced by a single-phase switched capacitor converter. As shown in FIG. 8, the single-phase switched capacitor converter is coupled between an input power source VIN and the battery 460. The inductor 428 is coupled between a midpoint 427 of the single-phase switched capacitor converter and the battery 460 through the switch 441. The isolation switch 450 is coupled between the midpoint 427 and the battery 460.

As shown in FIG. 8, the single-phase switched capacitor converter comprises switches 421, 422, 423 and 424 connected in series between an input voltage bus 475 and ground. A flying capacitor 425 is connected between a common node of switches 421 and 422, and a common node of switches 423 and 424. A common node 427 of the switches 422 and 423 is connected to an output voltage bus 550 through a switch 441. As shown in FIG. 8, the output voltage bus 550 is connected to the battery 460 and an output capacitor 436. The battery 460 and the output capacitor 436 are connected in parallel.

In operation, the single-stage battery charger system shown in FIG. 8 functions as a multilevel switching charger when the isolation switch 450 is turned off. On the other hand, the single-stage battery charger system functions as a switched capacitor charger when the isolation switch 450 is turned on.

It should be noted that the various embodiments described above with respect to FIGS. 4-7 may be applicable the single-stage battery charger system shown in FIG. 8. For example, the isolation switch 450 shown in FIG. 8 may be implemented as a bulk switch depending on different applications and design needs. Furthermore, the switches 421 and 424 may be configured as always-on switches. The switches 422 and 423 are turned on and off according to the operating principle of the buck switching charger. Configuring the switches 421 and 424 as always-on switches helps to reduce switching losses, thereby improving the efficiency of the battery charger system.

Figure 9:
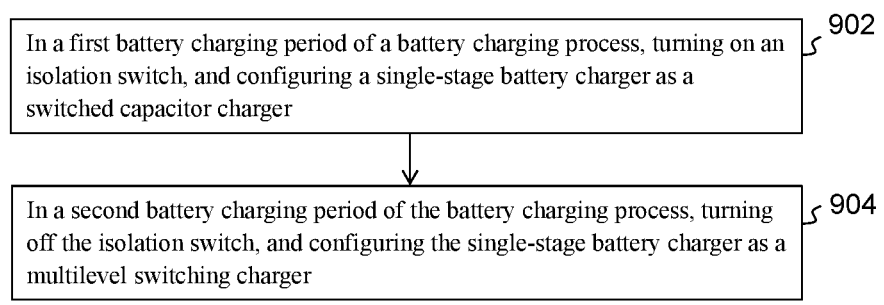
FIG. 9 illustrates a flow chart of a control method for the single-stage battery charger systems shown in FIGS. 4-8 in accordance with various embodiments of the present disclosure.

FIG. 9 illustrates a flow chart of a control method for the single-stage battery charger systems shown in FIGS. 4-8 in accordance with various embodiments of the present disclosure. This flowchart shown in FIG. 9 is merely an example, which should not unduly limit the scope of the claims. One of ordinary skill in the art would recognize many variations, alternatives, and modifications. For example, various steps illustrated in FIG. 9 may be added, removed, replaced, rearranged and repeated.

The single-stage battery charger system is coupled between an input power source and a battery. The single-stage battery charger system comprises a dual-phase switched capacitor converter, an inductor and an isolation switch as shown in FIGS. 4-7. Alternatively, the single-stage battery charger system comprises a single-phase switched capacitor converter, an inductor and an isolation switch as shown in FIG. 8.

The battery charging process includes five stages or phases, namely a pre-charge stage, a constant-current charging stage having a small charging current, a constant-current charging stage having a large charging current, a constant-voltage charging stage having a large charging current and a constant-voltage charging stage having a small charging current.

In the pre-charge stage, the charging current is about 100 mA. The battery voltage is in a range from about 2 V to about 3 V. In the constant-current charging stage having a small charging current, the charging current is about 3 A. The battery voltage is in a range from about 3 V to about 3.5 V. In the constant-current charging stage having a large charging current, the charging current is about 10 A. The battery voltage is in a range from about 3.5 V to about 4.2 V. In the constant-voltage charging stage having a large charging current, the charging current starts from about 10 A and decreases to about 2 A. The battery voltage is in a range from about 4.2 V to about 4.3 V. In the constant-voltage charging stage having a small charging current, the charging current starts from about 2 A and decreases to about 0 A. The battery voltage is about 4.3 V.

At step 902, in a first battery charging period of a battery charging process, the isolation switch is turned on. As a result of turning on the isolation switch, the single-stage battery charger is configured as a switched capacitor charger to provide power to the battery. In some embodiments, the switched capacitor charger is a dual-phase switched capacitor charger as shown in FIGS. 4-7. In alternative embodiments, the switched capacitor charger is a single-phase switched capacitor charger as shown in FIG. 8.

The first battery charging period may be selected from one of the constant-current charging stage having a large charging current and the constant-voltage charging stage having a large charging current.

At step 904, in a second battery charging period of the battery charging process, the isolation switch is turned off. After the isolation switch has been turned off, the single-stage battery charger is configured as a multilevel switching charger to provide power to the battery.

The second battery charging period may be selected from one of the five battery charging stages.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A single-stage battery charger system comprising:
a switched capacitor converter coupled between an input power source and a load;
an inductor coupled between a midpoint of the switched capacitor converter and the load; and
an isolation switch coupled between the midpoint and the load, wherein the isolation switch is configured such that:
the single-stage battery charger system functions as a multilevel switching charger when the isolation switch is turned off; and
the single-stage battery charger system functions as a switched capacitor charger when the isolation switch is turned on.

2. The single-stage battery charger system of claim 1, wherein the switched capacitor converter is a dual-phase switched capacitor converter comprising:
a first leg comprising a first switch, a second switch, a third switch and a fourth switch connected in series between an input voltage bus and ground;
a first flying capacitor connected between a common node of the first switch and the second switch, and a common node of the third switch and the fourth switch;
a second leg comprising a fifth switch, a sixth switch, a seventh switch and an eighth switch connected in series between the input voltage bus and ground, and wherein the midpoint of the switched capacitor converter is a common node of the sixth switch and the seventh switch; and
a second flying capacitor connected between a common node of the fifth switch and the sixth switch, and a common node of the seventh switch and the eighth switch.

3. The single-stage battery charger system of claim 2, wherein:
the inductor is connected to a common node of the sixth switch and the seventh switch; and
the common node of the sixth switch and the seventh switch is connected to a common node of the second switch and the third switch through the isolation switch.

4. The single-stage battery charger system of claim 2, wherein:
the inductor is connected to a common node of the sixth switch and the seventh switch;
a common node of the second switch and the third switch is connected to the load; and
the isolation switch and the inductor are connected in parallel.

5. The single-stage battery charger system of claim 2, wherein:
the inductor is connected to the load and an output capacitor through a switch.

6. The single-stage battery charger system of claim 2, wherein:
the dual-phase switched capacitor converter and the inductor are configured as a three-level switching charger when the isolation switch is turned off, and the switches of the first leg are turned off, and wherein an output voltage of the three-level switching charger is higher than a voltage of the load.

7. The single-stage battery charger system of claim 2, wherein:
the dual-phase switched capacitor converter is configured as a single-phase switched capacitor charger when the isolation switch is turned off, and the switches of the second leg are turned off.

8. The single-stage battery charger system of claim 2, wherein:
the dual-phase switched capacitor converter and the inductor are configured as a single-phase switched capacitor charger and a three-level switching charger when the isolation switch is turned off, and wherein an output voltage of the three-level switching charger and an output voltage of the single-phase switched capacitor charger are independent from each other.

9. The single-stage battery charger system of claim 2, wherein:
the load is a battery configured as a power source; and
the second leg of the dual-phase switched capacitor converter and the inductor form a boost converter configured to convert a voltage of the battery into a higher voltage.

10. The single-stage battery charger system of claim 1, wherein the switched capacitor converter is a single-phase switched capacitor converter, and wherein:
the single-phase switched capacitor converter comprises a first switch, a second switch, a third switch and a fourth switch connected in series between an input voltage bus and ground, and wherein the midpoint of the switched capacitor converter is a common node of the second switch and the third switch;
a flying capacitor is connected between a common node of the first switch and the second switch, and a common node of the third switch and the fourth switch; and
the inductor is connected to a common node of the second switch and the third switch.

11. The single-stage battery charger system of claim 10, wherein:
the isolation switch is coupled between a common node of the second switch and the third switch and the load.

12. The single-stage battery charger system of claim 1, wherein:
the isolation switch is implemented as two back-to-back connected transistors.

13. The single-stage battery charger system of claim 1, wherein:
the isolation switch is implemented as a bulk switch.

14. A method comprising:
in a first battery charging period of a battery charging process, turning on an isolation switch, and configuring a single-stage battery charger as a switched capacitor charger; and
in a second battery charging period of the battery charging process, turning off the isolation switch, and configuring the single-stage battery charger as a multilevel switching charger.

15. The method of claim 14, wherein the single-stage battery charger comprises a dual-phase switched capacitor converter, an inductor and the isolation switch, and wherein:
a first leg of the dual-phase switched capacitor converter comprises a first switch, a second switch, a third switch and a fourth switch connected in series between an input voltage bus and ground;
a first flying capacitor is connected between a common node of the first switch and the second switch, and a common node of the third switch and the fourth switch;
a second leg of the dual-phase switched capacitor converter comprises a fifth switch, a sixth switch, a seventh switch and an eighth switch connected in series between the input voltage bus and ground;
a second flying capacitor is connected between a common node of the fifth switch and the sixth switch, and a common node of the seventh switch and the eighth switch; and
the inductor is connected to a common node of the sixth switch and the seventh switch.

16. The method of claim 15, wherein:
the isolation switch is coupled between the common node of the sixth switch and the seventh switch and a common node of the second switch and the third switch.

17. The method of claim 15, wherein:
the isolation switch is in parallel with the inductor.

18. The method of claim 15, further comprising:
configuring the multilevel switching charger as a Buck switching charger by configuring the fifth switch and the eighth switch as always-on switches.

19. The method of claim 14, wherein the single-stage battery charger comprises a single-phase switched capacitor converter, an inductor and the isolation switch, and wherein:
the single-phase switched capacitor converter comprises a first switch, a second switch, a third switch and a fourth switch connected in series between an input voltage bus and ground;
a flying capacitor is connected between a common node of the first switch and the second switch, and a common node of the third switch and the fourth switch; and
the inductor is connected to a common node of the second switch and the third switch.

20. The method of claim 19, wherein:
the isolation switch is coupled between a common node of the second switch and the third switch and a battery.

* * * * *